US010260473B2

(12) United States Patent
Pedlar et al.

(10) Patent No.: US 10,260,473 B2
(45) Date of Patent: Apr. 16, 2019

(54) START-STOP SYSTEM

(71) Applicant: Ford Global Technologies, LLC, Dearborn, MI (US)

(72) Inventors: Chris Pedlar, Chelmsford (GB); David Hesketh, Ingatestone (GB); Gary Paisley, Romford (GB); Dilli Raj Poudel, Chigwell (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/907,080

(22) Filed: Feb. 27, 2018

(65) Prior Publication Data

US 2018/0274509 A1 Sep. 27, 2018

(30) Foreign Application Priority Data

Mar. 23, 2017 (GB) .................................. 1704572.5

(51) Int. Cl.
*F02N 11/08* (2006.01)

(52) U.S. Cl.
CPC ...... *F02N 11/0822* (2013.01); *F02N 11/0837* (2013.01); *F02N 2200/102* (2013.01); *F02N 2200/124* (2013.01)

(58) Field of Classification Search
CPC .. F02N 11/08; F02N 11/0822; F02N 11/0837; F02N 2200/102; F02N 2200/124
See application file for complete search history.

(56) References Cited

U.S. PATENT DOCUMENTS

| 5,700,227 A * | 12/1997 | Kosik ................... B60W 10/02 192/12 R |
| 7,941,252 B2 * | 5/2011 | Medema ................. B61L 17/00 123/179.16 |
| 8,998,774 B2 | 4/2015 | Yu et al. |
| 2014/0066255 A1 | 3/2014 | Yu et al. |

(Continued)

FOREIGN PATENT DOCUMENTS

| EP | 2799693 A1 | 11/2014 |
| WO | 2008122368 A1 | 10/2008 |

OTHER PUBLICATIONS

Intellectual Property Office of the United Kingdom, Combined Search and Examination Report Issued in Application No. GB1704572.5, dated Aug. 4, 2017, South Wales, 7 pages.

*Primary Examiner* — Hieu T Vo
(74) *Attorney, Agent, or Firm* — David Kelley; McCoy Russell LLP (57) ABSTRACT

Systems and methods are provided for a vehicle including a start-stop system configured to shut down and restart an engine of the vehicle automatically based on a brake value of a brake system. In one example, the method may include determining a first threshold brake value as a first function of a gradient of a surface on which the vehicle is positioned, determining a second threshold brake value as a second function of the gradient, wherein a difference between the first and second threshold brake values varies as a function of the gradient, shut down the engine when the brake value exceeds the first threshold brake value, and restart the engine when the brake value drops below the second threshold brake value. In this way, an incidence of inadvertent engine shut downs and restarts when the vehicle is stopped on an incline may be decreased.

20 Claims, 4 Drawing Sheets

(56) References Cited

U.S. PATENT DOCUMENTS

2014/0066256 A1 3/2014 Yu et al.
2015/0239450 A1 8/2015 Yu et al.
2016/0023660 A1 1/2016 Yu
2016/0325749 A1 11/2016 Lee et al.

* cited by examiner

START-STOP SYSTEM

CROSS REFERENCE TO RELATED APPLICATION

This application claims priority to Great Britain Patent Application No. 1704572.5, entitled "A START-STOP SYSTEM", and filed Mar. 23, 2017, the entire contents of which are hereby incorporated by reference for all purposes.

FIELD

The present description relates generally to a start-stop system for a motor vehicle.

BACKGROUND/SUMMARY

Vehicles, such as motor vehicles, may include a start-stop system configured to shut down an engine of the motor vehicle automatically when the engine is not required, e.g., when torque from the engine is not required to drive the vehicle, and to restart the engine automatically when desirable. Shutting down the engine in such circumstances reduces the idling time of the engine, increases fuel efficiency, and reduces vehicle emissions. Such an engine shut down may be referred to as an idle-stop. In some examples, the start-stop system determines when to shut down and restart the engine according to a brake pressure or braking torque of the brake system. For example, when the brake pressure exceeds a threshold brake pressure value, the start-stop system may shut down the engine, and when the brake pressure drops below the threshold brake pressure value, the start-stop system may restart the engine. Additionally, conditions for the start-stop system shutting down the engine may include the vehicle traveling below a threshold speed, such as when the vehicle is stopped.

Drivers are typically able to judge a level (e.g., amount) of brake pressure for bringing a vehicle to a stop when the vehicle is traveling on a flat surface. After a period of driving a vehicle equipped with a start-stop system, the driver may develop a sense of the level of brake pressure for stopping the vehicle and a level of brake pressure that will lead to the engine being shut down when the vehicle comes to a stop. The driver is therefore able to modulate the brake pressure to achieve a desired performance of the vehicle.

When the vehicle stops on an incline, an amount of braking torque (and therefore brake pressure) for holding the vehicle stationary is greater than when the vehicle stops on a flat surface. Consequently, start-stop systems are often configured such that the threshold brake pressure increases as the gradient of the surface on which the vehicle is traveling increases. One example of such a start-stop system is shown by Yu et al. in U.S. Pat. No. 8,998,774 B2. Therein, a vehicle is provided with a controller that is configured to shut down an engine in response to a brake effort exceeding a first threshold and to restart the engine in response to the brake effort decreasing below a second threshold. The first threshold and the second threshold are based on an estimated vehicle mass and a road gradient and are offset from each other to provide a hysteresis region.

However, the inventors herein have recognized potential issues with such systems. As one example, a fixed offset may not fully reduce inadvertent engine stops and restarts. For example, drivers often overestimate the amount of brake pressure for bringing the vehicle to a stop on an incline. As a result, drivers frequently trigger the start-stop system to inadvertently shut down the engine when stopping on an incline. Furthermore, when a driver brings the vehicle to a stop on an incline, the driver typically relaxes their foot and releases the brake pedal a greater amount than when stopping on a flat surface. This can lead to the engine being restarted before engine torque is needed. A start-stop system that is more intuitive for the driver to operate and reduces inadvertent shutting down and/or restarting of the engine when stopping a vehicle on an incline is therefore desirable.

In one example, the issues described above may be addressed by a method, comprising: stopping a vehicle engine when a brake value related to vehicle braking force exceeds a first threshold brake value related to a first function of road gradient; and restarting the engine when the brake value falls below a second threshold value related to a second function of road gradient, the difference between the first and second threshold brake values varying based on a magnitude of the road gradient. In this way, inadvertent engine shut downs and restarts may be reduced.

As one example, the first function of road gradient and/or the second function of road gradient may define a proportional relationship between the road gradient and the corresponding threshold brake value, such that as a magnitude of the road gradient increases, the corresponding threshold brake value increases. As another example, the first function of road gradient and/or the second function of road gradient may define a relationship between the road gradient and the corresponding threshold brake value in which the corresponding threshold brake value tends to a maximum value as the road gradient increases. In another example, the first and second functions of road gradient may be defined such that the difference between the first and second threshold brake values increases as the road gradient increases until a maximum value is reached. As still another example, the first and second functions of road gradient may be defined such that the difference between the first and second threshold brake values tends to a maximum value as the road gradient increases. At least one of the first and second threshold brake values may comprise a threshold brake pressure value, a threshold braking torque value, a brake pedal displacement value, or a threshold value based on any other parameter or characteristic of the brake system. The first and second threshold brake values may relate to the same parameter or characteristic of the brake system. Alternatively, the first and second threshold brake values may relate to different parameters or characteristics of the brake system. For example, the first threshold brake value may relate to a brake pressure, and the second threshold brake value may relate to a braking torque. By varying the first and second threshold brake values as well as the difference between the first and second threshold brake values based on the road gradient, a driver of the vehicle may experience increased, more intuitive control over engine operation, increasing driver satisfaction. By reducing inadvertent engine shut downs and restarts, fuel economy may be increased, vehicle emissions may be reduced, and vehicle wear may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
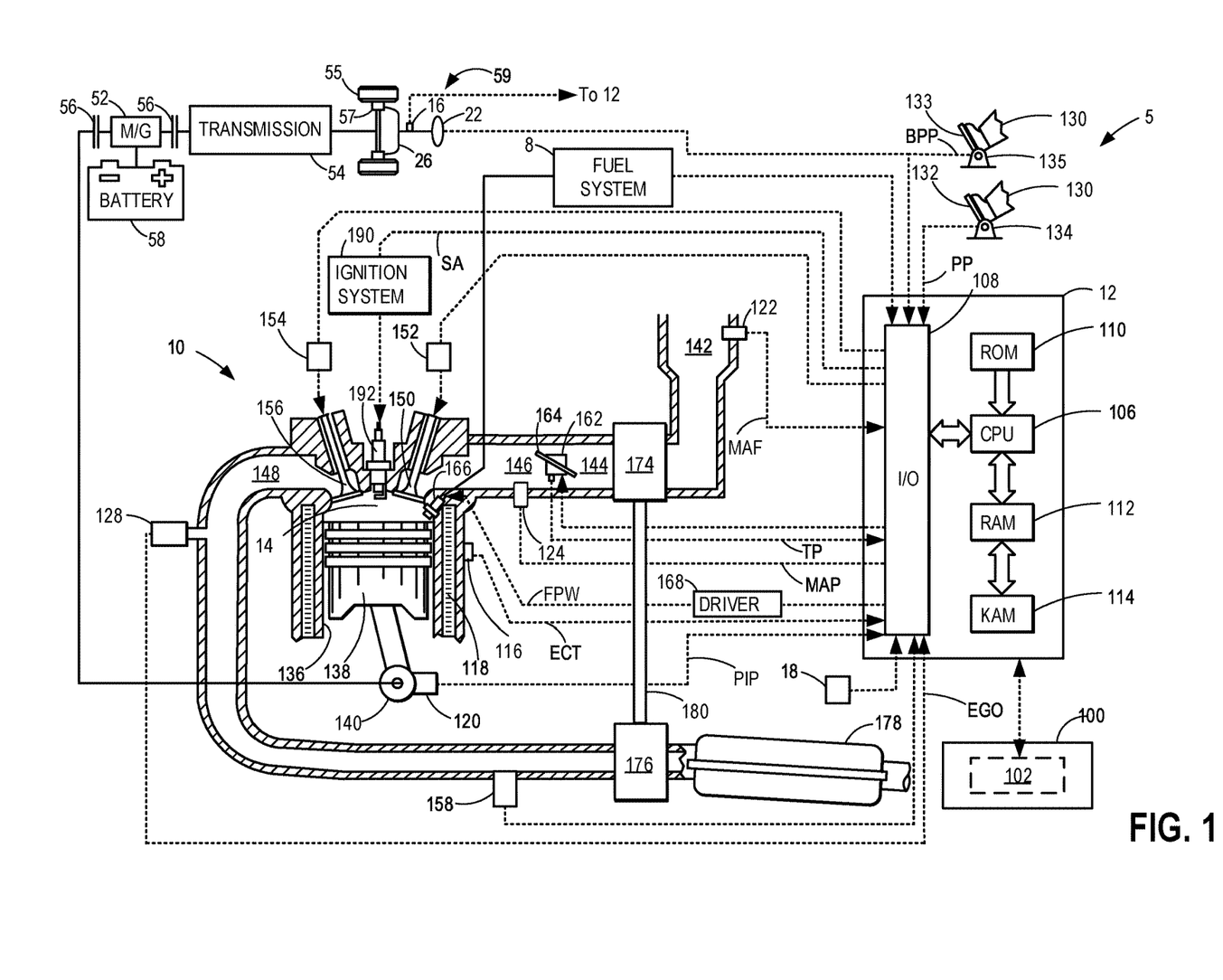
FIG. 1 is a schematic view of a vehicle system, including a start-stop system.

The following description relates to systems and methods for operating a start-stop system in a vehicle, such as the vehicle schematically illustrated in FIG. 1. For example, the start-stop system may determine a first threshold brake value for shutting down an engine of the vehicle and a second threshold brake value for restarting the engine, such as according to the example method shown in FIG. 2, and control engine operation accordingly. The first and second threshold brake values may be determined using a first and a second function of gradient, respectively, such as the example first and second functions of gradient illustrated in FIGS. 3-5. The first and second functions of gradient relate a current gradient of a surface on which the vehicle is positioned to a brake value for shutting down and restarting the engine, respectively. FIG. 6 illustrates an example timeline for shutting down and restarting the engine based on the first and second threshold brake values, respectively, at a given gradient and a brake value applied by a vehicle operator, such as by depressing a brake pedal. By determining the first and second threshold brake values based on the gradient via the first and second functions of gradient, respectively, hysteresis between the first and second threshold brake value also varies based on the gradient, providing for a greater tolerance to operator foot movements on the brake pedal.

Turning now to the figures, FIG. 1 depicts an example embodiment of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Vehicle wheels 55 may include a brake system 59 to slow the rotation of vehicle wheels 55. Brake system 59 may include friction brakes, such as disc brakes or drum brakes, or electromagnetic (e.g., electromagnetically-actuated) brakes, for example, both friction brakes and electromagnetic brakes configured to slow the rotation of vehicle wheels 55, and thus the linear motion of vehicle 5. As an example, brake system 59 may be a hydraulic brake system including brake calipers 57, a brake servo 22, and brake lines 26 configured to carry brake fluid between brake servo 22 and brake calipers 57. Brake system 59 may be configured such that a braking torque applied to wheels 55 by the brake system varies according to the pressure of brake fluid within the system, such as within brake lines 26. Furthermore, vehicle operator 130 may depress a brake pedal 133 to control an amount of braking torque supplied by brake system 59, such as by controlling the pressure of brake fluid within brake lines 26, to decelerate vehicle 5 and/or hold vehicle 5 stationary. As an example, brake system 59 may further include a brake sensor 16 configured to determine the brake torque applied, such as by measuring the pressure of brake fluid within brake system 59 in order to determine the braking torque. Alternatively, the braking torque may be determined based on a position of brake pedal 133. For example, a brake pedal position sensor 135 may generate a proportional brake pedal position signal BPP, which may be used to determine the amount of braking torque.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT to expedite catalyst warm-up during engine start. The retarded spark timing serves to transfer more heat to the exhaust than occurs at MBT timing, which may then be transferred to the catalyst as the exhaust is treated.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternative example, fuel injector 166 may be arranged in intake passage 146 rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; an absolute manifold pressure signal (MAP) from a MAP sensor 124; brake fluid pressure from brake sensor 16; and a gradient sensor 18 for determining the gradient of a surface on which vehicle 5 is currently positioned. Gradient sensor 18 may comprise one or more sensors, such as any sensor capable of conveying information for determining the gradient of the surface or an altitude of the vehicle when positioned on or traveling over the surface. For example, gradient sensor 18 may include one or more of an altitude sensor, an accelerometer, a vehicle torque sensor, a gear selection sensor (e.g., of transmission 54), etc. Thus, in some examples, gradient sensor 18 may comprise a collection of sensors in varying locations throughout vehicle 5 that can be used to determine the gradient as well as other operating conditions. Controller 12 may use the signals received from gradient sensor 18 to estimate the gradient of the surface, such as by inputting the signals received from gradient sensor 18 into one or more look-up tables, maps, or models and outputting the corresponding gradient. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Furthermore, vehicle 5 may include a start-stop system 100. Start-stop system 100 may comprise a controller 102 configured to determine when to shut down and restart engine 10 and to control the engine accordingly, such as when a pre-determined start-stop condition is satisfied. Controller 102 may be a dedicated controller of start-stop system 100 that is communicatively coupled to controller 12. Alternatively, controller 102 may be omitted, and controller 12 may be configured to determine when to shut down and restart engine 10, for example. In still other examples, controller 102 may be included in another engine control unit or powertrain control module that is communicatively coupled to controller 12.

Controller 12 receives signals from the various sensors of FIG. 1 and employs the various actuators of FIG. 1 to adjust engine operation based on the received signals and instructions stored on a memory of the controller. For example, controller 12 and/or controller 102 may receive an indication of an amount of braking torque provided by brake system 59 from brake sensor 16 and/or signal BPP from brake pedal position sensor 135 and shut down engine 10 when the amount of braking torque exceeds a threshold value, as further described below. Further, based on the signals received from brake sensor 16 and/or brake pedal position sensor 135, controller 12 and/or controller 102 may restart engine 10 automatically, e.g., by operating a starter motor or electric machine 52, in response to the braking torque provided by brake system 59 dropping below the threshold value or a further (e.g., second) threshold value.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Figure 2:
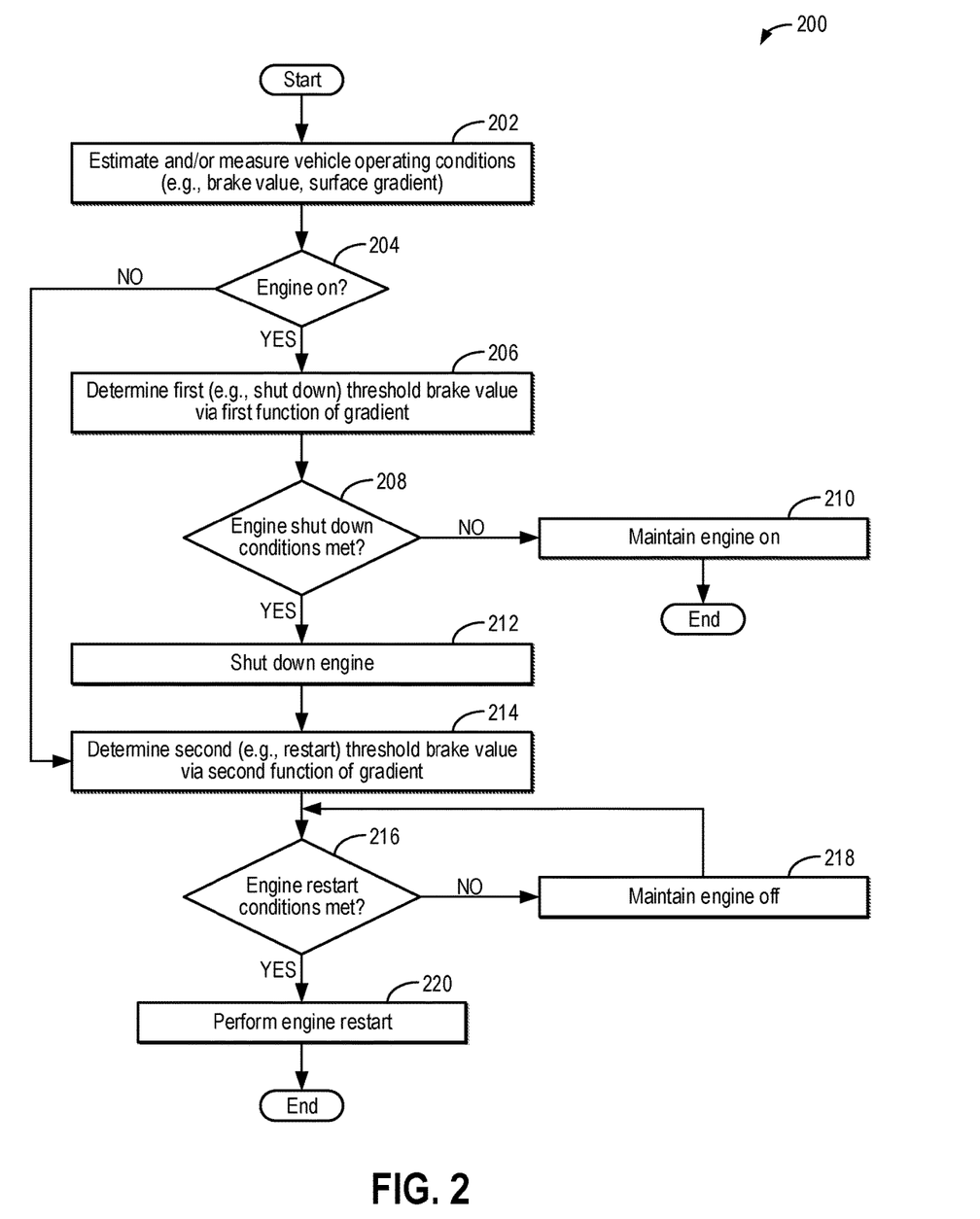
FIG. 2 shows a method for determining first and second threshold brake values as functions of gradient, which may be used for operating a start-stop system of a vehicle.

Next, FIG. 2 shows an example method 200 for operating a start-stop system in a vehicle (e.g., start-stop system 100 of FIG. 1). In particular, method 200 may be used for determining threshold brake values, such as a shutdown threshold brake value and a restart threshold brake value, for controlling an automatic (e.g., not directly commanded by a vehicle operator) shutdown and restart of an engine of the vehicle, such as to execute an idle stop. Instructions for carrying out method 300 and the rest of the methods included herein may be executed by a controller (e.g., controller 12 and/or controller 102 of FIG. 1) based on instructions stored on a memory of the controller and in conjunction with signals received from sensors of the engine system, such as the sensors described above with reference to FIG. 1 (e.g., brake sensor 16, brake pedal position sensor 135, and gradient sensor 18 of FIG. 1). The controller may employ engine actuators of the engine system (e.g., electric machine 52 of FIG. 1) to adjust engine operation according to the methods described below.

Method 200 begins at 202 and includes estimating and/or measuring vehicle operating conditions. Operating conditions may include, for example, vehicle speed, a state of charge (SOC) of a system battery (e.g., system battery 58 of FIG. 1), engine status (e.g., on or off), engine load, engine temperature, engine speed, torque demand, a brake value of a brake system of the vehicle (e.g., brake system 59 of FIG. 1), and a gradient of a surface on which the vehicle is currently positioned (e.g., as determined based on signals from a gradient sensor, such as gradient sensor 18 of FIG. 1). The brake value may correspond to a brake pressure within brake lines of the brake system, such as measured by a sensor positioned within the brake lines (e.g., brake sensor 16 of FIG. 1). As another example, the brake value may correspond to a value of displacement (e.g., a position) of a brake pedal (e.g., brake pedal 133 of FIG. 1), such as measured by a brake pedal position sensor (e.g., brake pedal position sensor 135 of FIG. 1). Alternatively, the controller may be configured to convert the measurements from the one or more brake sensors into a corresponding brake value. For example, the controller may be configured to convert the displacement of the brake pedal (e.g., from a neutral position at which no braking torque is applied to vehicle wheels), as measured by the brake pedal position sensor, to a brake torque (e.g., an expected brake torque based on the level of brake pedal displacement).

At 204, method 200 includes determining if the engine is on (e.g., operating at a non-zero speed, with combustion occurring in engine cylinders). If the engine is not on (e.g., the engine is at rest, without combustion occurring in the engine cylinders), method 200 proceeds to 214, as will be described below. If the engine is on, method 200 proceeds to 206 and includes determining a first (e.g., shut down) threshold brake value via a first function of gradient. At brake values at or above the first threshold brake value, the controller may shut down the engine (e.g., in response to engine shut down conditions being met, as described below), and at brake values less than the first threshold brake value, the controller may not shut down the engine. As will be described with respect to FIGS. 3-5, the first function of gradient relates the brake value to gradient such that the first threshold brake value varies with respect to gradient. As an example, the first threshold brake value may be lower at lower magnitudes of gradient, such as when the vehicle is positioned on a substantially level surface, than at higher magnitudes of gradient, such as when the vehicle is positioned on a hill. The controller may determine the first threshold brake value directly via the first function of gradient, or via a map or look-up table that relates the gradient to the first threshold brake value via the relationship defined by the first function of gradient. For example, the controller may input the current gradient into a look-up table and output the corresponding first threshold brake value. The look-up table may be populated according to the first function of gradient during calibration of the start-stop system, e.g., as part of the manufacturing process of the vehicle.

At 208, it is determined if engine shut down conditions are met. The engine shut down conditions may include, for example, the current brake value being at or above the first threshold brake value determined for the current gradient (e.g., as determined at 206). The engine shut down conditions may further include the battery state of charge (SOC) being above a threshold SOC (e.g., at least 30%) and vehicle speed being less than a threshold speed (e.g., below 5 mph). In some examples, all of the engine shut down conditions may be confirmed for an engine shut down to be initiated. In other examples, the engine shut down may be initiated in response to the current brake value being at or above the first threshold brake value. If the engine shut down conditions are not met—in particular, if the brake value is less than the first threshold brake value—method 200 proceeds to 210 and includes maintaining the engine on. For example, fuel and spark will continue to be provided to the engine cylinders to produce combustion torque. Following 210, method 200 ends.

If the engine shut down conditions are met—in particular, if the current brake value is at or above the first threshold brake value at 208—method 200 proceeds to 212 and includes shutting down the engine. For example, the controller of the start-stop system may automatically (that is, without the vehicle operator requesting engine shutdown) deactivate engine fueling, ceasing combustion within the engine cylinders, and spin the engine to rest. By enabling automatic engine shut down when the engine shut down conditions are met, fuel economy may be improved. Further, by enabling the automatic engine shut down when the current brake value is at or above the first threshold brake value and not when the current brake value is less than the first threshold brake value, frequent, unintended engine stops may be prevented.

At 214, method 200 includes determining a second threshold brake value via a second function of gradient. At brake values at or below the second threshold brake value, the controller may restart the engine (as will be described below), and at brake values greater than the second threshold brake value, the engine may remain off. As will be described with respect to FIGS. 3-5, the second function of gradient relates the brake value to gradient such that the second threshold brake value varies with respect to gradient. As an example, the second threshold brake value may be lower at lower magnitudes of gradient, such as when the vehicle is positioned on a substantially level surface, than at higher magnitudes of gradient, such as when the vehicle is positioned on a hill. Furthermore, the second threshold brake value is less than the first threshold brake value at a given gradient. The controller may determine the second threshold brake value directly via the second function of gradient, or via a map or look-up table that relates the gradient to the second threshold brake value via the relationship defined by the second function of gradient. For example, the controller may input the current gradient into a look-up table and output the corresponding second threshold brake value. The look-up table may be populated according to the second function of gradient during calibration of the start-stop system, e.g., as part of the manufacturing process of the vehicle.

At 216, it is determined if engine restart conditions are met. The engine restart conditions may include, for example, the current brake value being less than or equal to the second threshold brake value determined for the current gradient (e.g., as determined at 214). The engine restart conditions may further include an indication that the engine is currently undergoing an idle-stop (no fuel is being combusted in the engine while the vehicle remains on), the torque demanded by the operator is above a predetermined threshold (such as the operator tipping in), or the battery SOC drops below the threshold SOC. In some examples, any or all of the engine restart conditions may be confirmed for an engine restart to be initiated. In other examples, the engine restart may be initiated in response to the current brake value being less than or equal to the second threshold brake value.

If the engine restart conditions are not met—in particular, if the brake value is greater than the second threshold brake value—method 200 proceeds to 218 and includes maintaining the engine off. The engine will remain at rest, without fuel supplied to the engine and without combustion occurring within the engine cylinders. Method 200 may then return to 216. If the engine restart conditions are met—in particular, if the brake value is less than or equal to the second threshold brake value at 216—method 200 proceeds to 220 and includes performing an engine restart. The engine restart may include, for example, cranking the engine to a non-zero speed with an electric motor (e.g., electric machine 52 of FIG. 1) and initiating combustion in the engine cylinders via fuel delivery and spark. By enabling the automatic engine restart when the current brake value is less than or equal to the second threshold brake value and not when the current brake value is greater than the second threshold brake value, frequent, unintended engine restarts may be prevented. Following 220, method 200 ends.

Figure 3:
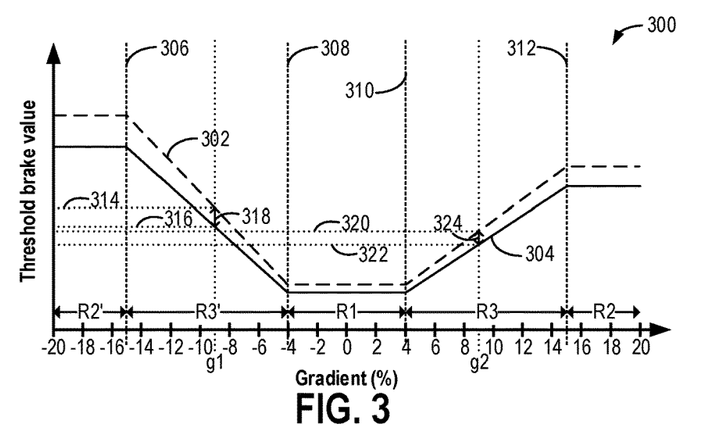
FIG. 3 shows a first example of first and second functions of gradient that may be used within a start-stop system according to the present disclosure.
Figure 4:
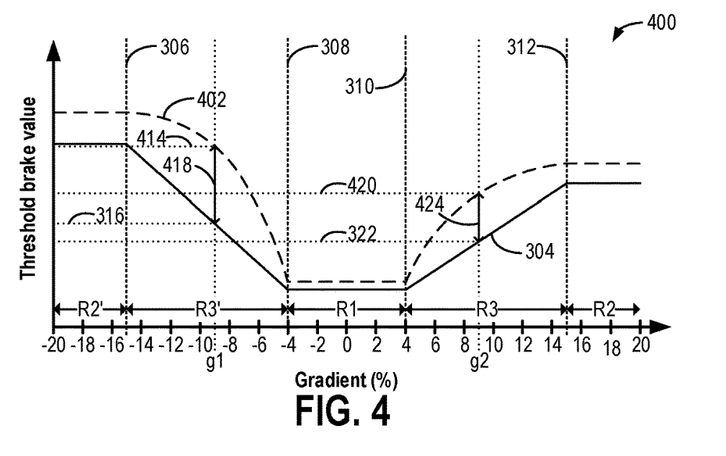
FIG. 4 shows a second example of first and second functions of gradient that may be used within a start-stop system according to the present disclosure.
Figure 5:
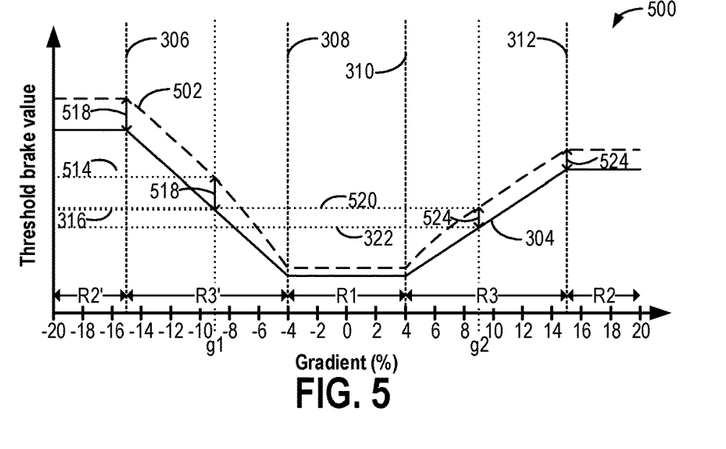
FIG. 5 shows a third example of first and second functions of gradient that may be used within a start-stop system according to the present disclosure.
Figure 6:
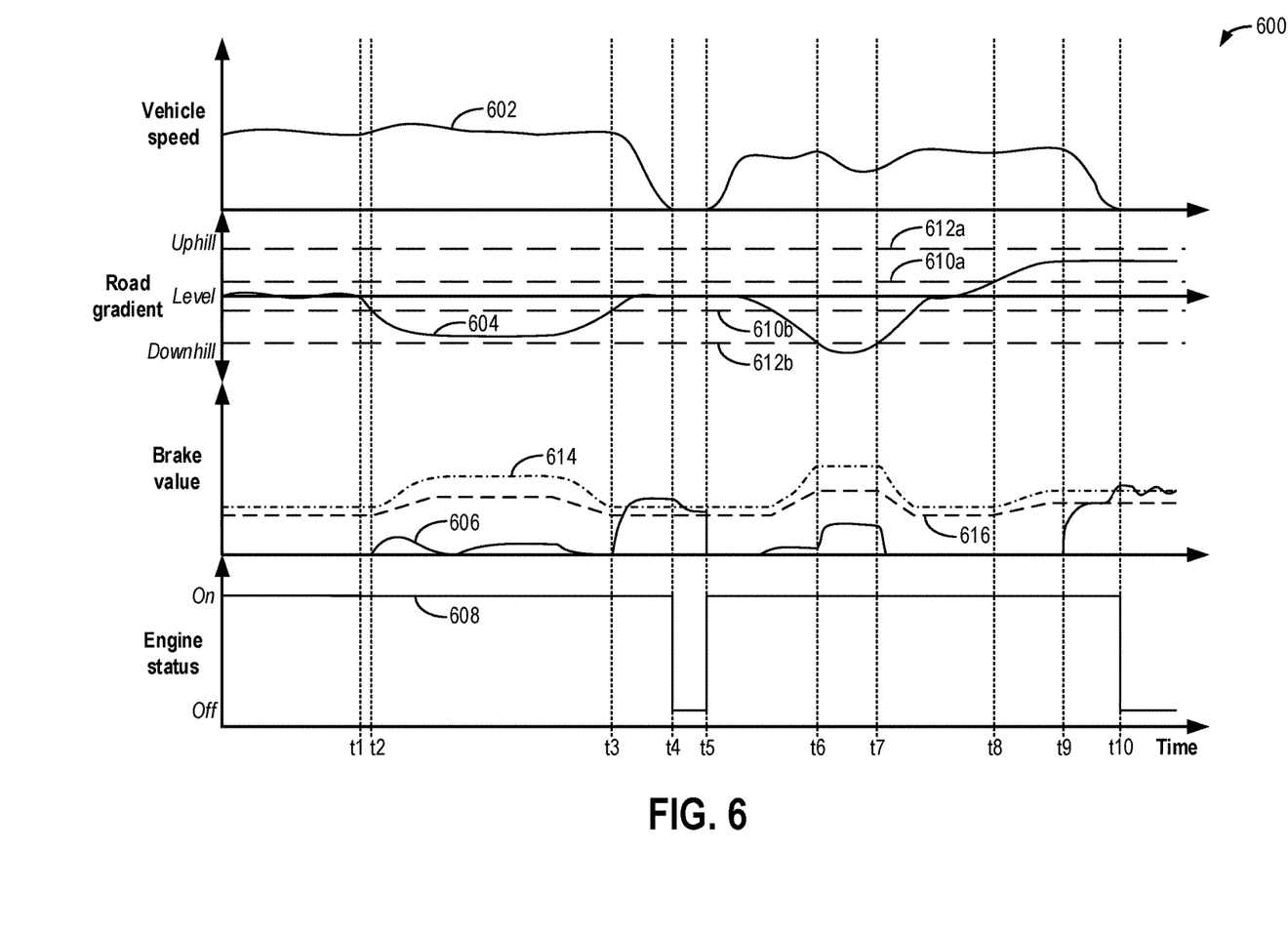
FIG. 6 shows a prophetic example timeline for shutting down and restarting an engine in a vehicle based on a brake value applied by a vehicle operator.

FIGS. 3-5 depict first and second functions of gradient that may be applied by a start-stop system in a vehicle to control engine shutdown and restart. In particular, a controller of the start-stop system (e.g., controller 12 and/or controller 102 of FIG. 1) may utilize the first and second functions of gradient to determine a first (e.g., shut down) threshold brake value and a second (e.g., restart) threshold brake value, respectively, such as according to the method of FIG. 2. FIG. 3 depicts a first example graph 300 of a first function of gradient 302 (dashed line) and a second function of gradient 304 (solid line), FIG. 4 depicts a second example graph 400 of a first function of gradient 402 (dashed line) and the second function of gradient 304, and FIG. 5 depicts a third example graph 500 of a first function of gradient 502 (dashed line) and the second function of gradient 304. Like components of FIGS. 3-5 are numbered the same and may not be reintroduced.

The horizontal axes of graphs 300, 400, and 500 represent the gradient of the surface on which the vehicle is positioned (in percent). Negative gradient values refer to a downhill grade (e.g., with respect to a front of the vehicle), with the magnitude of the downhill grade increasing along the horizontal axis to the left of zero (with zero referring to a level surface, with a slope of zero). Positive gradient values refer to an uphill grade (with respect to the front of the vehicle), with the magnitude of the uphill grade increasing along the horizontal axis to the right of zero. Thus, a downhill grade with a gradient of 10% has the same magnitude of gradient as an uphill grade with a gradient of −10%. The vertical axes represent the threshold brake value. As described above, the controller may shut down the engine when a brake value of a brake system (e.g., brake system 59 of FIG. 1) surpasses the first threshold brake value and restart the engine when the brake value drops below the second threshold brake value, with the first and second threshold brake values varying as a function of gradient. A vehicle operator may adjust the brake value by adjusting a position of a brake pedal (e.g., brake pedal 133 of FIG. 1).

In the examples of FIGS. 3-5, the threshold brake value is a brake pressure value, such as measured by a brake sensor (e.g., brake sensor 16 of FIG. 1). In other examples, the threshold brake value may be a brake torque value or a brake pedal displacement value, and the first and second functions may be defined accordingly. In such example, one or more brake sensors may be configured to measure the corresponding characteristic of the brake system (e.g., as described above with respect to FIG. 2), such that the controller may directly relate the operation of the brake system to the threshold brake value provided by the first and second functions of gradient.

With reference to graph 300 (FIG. 3), graph 400 (FIG. 4), and graph 500 (FIG. 5), the second function of gradient 304 has been defined such that the brake pressure value given by the second function of gradient at each gradient value is substantially equal to the brake pressure required to hold the vehicle stationary on a surface inclined at the gradient value. In other examples, the brake pressure defined by the second function of gradient 304 at the particular gradient value may be greater than the brake pressure required to hold the vehicle stationary. Each first threshold of gradient (plot 302 of FIG. 3, plot 402 of FIG. 4, and plot 502 of FIG. 5) also relates brake pressure to gradient. As depicted, the first and second functions of gradient are defined such that a difference between the values of the first and second threshold brake values varies as the gradient increases, such as over a range of gradients, so that hysteresis of the start-stop system also varies as a function of gradient.

Within a first range of gradient R1, e.g., when the magnitude of the gradient is below a lower threshold gradient magnitude defined by dashed line 308 in the negative gradient direction and dashed line 310 in the positive gradient direction, the first and second threshold brake values may be substantially constant. For example, the first and second threshold brake values may be equal to first and second minimum threshold values, respectively. In second ranges of gradient R2 and R2', e.g., when the magnitude of the gradient is above an upper threshold gradient defined by dashed line 306 in the negative gradient direction (R2') and dashed line 312 in the positive gradient direction (R2), the first and second threshold brake values may also be substantially constant and different than the substantially constant threshold brake values within the first range of gradient R1. Furthermore, even though the magnitude of gradient is the same, the first and second threshold brake values are greater in the second range of gradient R2', which is in the negative gradient (e.g., downhill) direction, than in second the gradient range R2, which is in the positive gradient (e.g., uphill) direction. For example, the first and second threshold brake values may be greater in the second range of gradient R2' due to a combination of creep torque (e.g., torque transferred from the engine to vehicle wheels by the automatic transmission whilst the engine is idling) and acceleration due to gravity in the downhill direction. The first and second threshold brake values may be equal to first and second downhill maximum threshold values, respectively, in the second range of gradient R2' and equal to first and second uphill maximum threshold values, respectively, in the second range of gradient R2, for example. Thus, the first and second threshold brake values may vary based on the magnitude of the gradient and the direction that the vehicle is facing on the surface.

In third ranges of gradient R3 and R3', e.g., when the magnitude of the gradient is between the lower and upper threshold gradients (e.g., between upper threshold gradient 306 and lower threshold gradient 308 for R3', and between upper threshold gradient 312 and lower threshold gradient 310 for R3), the first and second threshold brake values vary with gradient. With reference to FIG. 3, the first function of gradient 302 varies proportionally with gradient. Additionally, the difference between the first and second threshold brake values varies proportionally with gradient within the third gradient ranges R3 and R3'. Furthermore, both the first and second threshold brake values increase more rapidly as the magnitude of the gradient increases in the negative gradient direction than the positive gradient direction. For example, the first function of gradient 302 and the second function of gradient 304 each have a steeper slope in the third range of gradient R3' than in the third range of gradient R3.

As an explanatory example, a negative gradient value g1 within the third range of gradient R3' has the same magnitude as a positive gradient value g2 within the third range of gradient R3. At gradient value g1, the first function of gradient 302 gives a first threshold brake value 314, and the second function of gradient 304 gives a second threshold brake value 316. A hysteresis value 318 is indicated between the first threshold brake value 314 and the second threshold brake value 316. At gradient value g2, the first function of gradient 302 gives a first threshold brake value 320, which is different than (e.g., less than) the first threshold brake value 314 at gradient value g1, and the second function of gradient 304 gives a second threshold brake value 322, which is different than (e.g., less than) the second threshold brake value 316 at gradient value g1. Furthermore, a hysteresis value 324 between the first threshold brake value 320 and the second threshold brake value 322 is different than (e.g., less than) hysteresis value 318 at gradient value g1.

While graph 300 of FIG. 3 shows a proportional relationship between the gradient and the first and second threshold brake values within the gradient ranges R3 and R3', in other examples, the relationship between the gradient and the first and/or second threshold brake values may not be proportional. Additionally or alternatively, the relationship between the difference between the first and second threshold brake values and the gradient may not be proportional.

Turning now to FIG. 4, within the third gradient ranges R3 and R3', the first function of gradient 402 tends toward the maximum first threshold brake values. Additionally or alternatively, in other examples, the second function of gradient may tend toward the maximum second threshold brake values. In the example shown in FIG. 4, the first function of gradient 402 increases more rapidly as the magnitude of the gradient increases than the first function of gradient 302 of FIG. 3. Further, the first function of gradient 402 is non-linear within the third gradient ranges R3 and R3'. At gradient value g1, the first function of gradient 402 gives a first threshold brake value 414, which is greater than the first threshold brake value 314 of FIG. 3. Furthermore, a hysteresis value 418 between the first threshold brake value 414 and the second threshold brake value 316 is greater than the hysteresis value 318 of FIG. 3. At gradient value g2, the first function of gradient 402 gives a first threshold brake value 420, which is different than (e.g., less than) the first threshold brake value 414 at gradient value g1 and different than (e.g., greater than) the first threshold brake value 320 given by the first function of gradient 302 shown in FIG. 3. Furthermore, a hysteresis value 424 between the first threshold brake value 420 and the second threshold brake value 322 is different than (e.g., less than) the hysteresis value 418 at gradient value g1 and is greater than the hysteresis value 324 of FIG. 3. As also shown in FIG. 4, the difference between the first function of gradient 402 and the second function of gradient 304 increases to a first local maximum approximately occurring around gradient value g1 within gradient range R3' and a second local maximum approximately occurring around gradient value g2 within gradient range R3 before decreasing again.

In other examples, the relationships between the gradient and the first and second threshold brake values may be defined such that the difference between the first and second functions of gradient tends toward a maximum value as the gradient magnitude of the increases. Such an example is shown by first function of gradient 502 of FIG. 5. At gradient value g1, the first function of gradient 502 gives a first threshold brake value 514, which is greater than the first threshold brake value 314 of FIG. 3 and less than the first threshold brake value 414 of FIG. 4. A hysteresis value 518 between the first threshold brake value 514 and the second threshold brake value 316 is greater than the hysteresis value 318 of FIG. 3 and less than the hysteresis value 418 of FIG. 4. Furthermore, the hysteresis value 518 is at a maximum value for the negative gradient direction at gradient value g1. For example, the hysteresis value may remain constant from gradient value g1 as the gradient becomes further negative such that the hysteresis value is the same at the upper threshold gradient 306, for example. At gradient value g2, the first function of gradient 502 gives a first threshold brake value 520, which is different than (e.g., less than) the first threshold brake value 514 at gradient value g1. Furthermore, the first threshold brake value 520 is greater than the first threshold brake value 320 given by the first function of gradient 302 shown in FIG. 3 and less than the first threshold brake value 420 given by the first function of gradient 402 shown in FIG. 4 the at gradient value g2. Furthermore, a hysteresis value 524 between the first threshold brake value 520 and the second threshold brake value 322 is different than (e.g., less than) the hysteresis value 518 at gradient value g1. The hysteresis value 524 is greater than the hysteresis value 324 of FIG. 3 and less than the hysteresis value 424 of FIG. 4 due to the differences in the first functions of gradients 502, 302, and 402, respectively. Furthermore, the hysteresis value 524 is at a maximum value for the positive gradient direction at the gradient value g2. The hysteresis value may remain constant from gradient value g2 as the gradient becomes further negative such that the hysteresis value is the same at the upper threshold gradient 312, for example.

Next, FIG. 6 shows a graph 600 of an example timeline for operating a vehicle including a start-stop system (e.g., vehicle 5 and start-stop system 100 of FIG. 1). For example, the start-stop system may automatically shut down and restart an engine of the vehicle based on a brake value of a brake system (e.g., brake system 59 of FIG. 1), such as a brake pressure of the brake system measured by a brake sensor (e.g., brake sensor 16 of FIG. 1). The brake pressure may increase proportionally with depression (e.g., displacement) of a brake pedal by a vehicle operator, for example. Vehicle speed is shown in plot 602, road gradient is shown in plot 604, brake value is shown in plot 606, a first threshold brake value is shown in plot 614 (dot-dashed line), a second threshold brake value is shown in plot 616 (dashed line), and engine status is shown in plot 608. For all of the above, the horizontal axis represents time, with time increasing along the horizontal axis from left to right. The vertical axis represents each labeled parameter. For plots 602, 606, 614, and 616, the value of the labeled parameter increases along the vertical axis from bottom to top. For plot 604, the road gradient is shown with respect to "level" (e.g., a gradient of zero). Positive gradient values represent uphill gradients and negative gradient values represent downhill gradients with respect to a direction the vehicle is facing, with the magnitude of the gradient increasing along the vertical axis as a distance from "level" increases. For plot 608, the vertical axis gives an indication of whether the engine is "on" (e.g., operating, with fuel supplied and combustion occurring in engine cylinders) or "off" (e.g., fuel is not supplied, and no combustion occurs in the engine cylinders). Furthermore, a first lower threshold gradient is indicated by dashed line 610a and a second lower threshold gradient is indicated by dashed line 610b, the first and second lower threshold gradients having the same magnitude of gradient in opposite directions (e.g., positive and negative, respectively). Similarly, a first upper threshold gradient is indicated by dashed line 612a and a second upper threshold gradient is indicated by dashed line 612b, the first and second upper threshold gradients having the same magnitude of gradient in opposite directions (e.g., positive and negative, respectively).

Prior to time t1, the engine is on (plot 608), providing combustion torque for propelling the vehicle a non-zero speed (plot 602). The brake pedal is not applied by the vehicle operator, and thus, the brake value is equal to zero (plot 606). Furthermore, the ground over which the vehicle is driven is relatively level, with the road gradient remaining within a gradient range defined by the first and second lower threshold gradients (e.g., dashed line 610a and 610b, respectively). The first threshold brake value (plot 614) and the second threshold brake value (plot 616) are each determined based on the road gradient. For example, the first threshold brake value, which corresponds to a threshold brake value for shutting down the engine for an idle-stop, is determined using a first function of gradient, and the second threshold brake value, which corresponds to a threshold brake value for restarting the engine from an idle-stop, is determined using a second function of gradient, such as according to method 200 of FIG. 2 and as illustrated with respect to FIGS. 3-5. With the road gradient (plot 604) remaining between the first and second lower threshold gradients (e.g., dashed line 610a and 610b, respectively), the first and second threshold brake values (plot 614 and plot 616, respectively) remain constant prior to time t1 and at their minimum values. The road gradient is within range R1 defined in FIGS. 3-5, for example.

At time t1, the vehicle begins to travel down a hill, as shown by the road gradient (plot 604) decreasing. At time t2, the road gradient drops below the second lower threshold gradient (dashed line 610b) but remains above the second upper threshold gradient (dashed line 612b), placing the gradient within a range corresponding to gradient range R3' of FIGS. 3-5, for example. Within the gradient range between the second lower threshold gradient (dashed line 610b) and the second upper threshold gradient (dashed line 612b), the first threshold brake value (plot 614) and the second threshold brake value (plot 616) vary based on the gradient. Between time t2 and time t3, the brake value (plot 606) increases but remains below the first threshold brake value (plot 614) for shutting down the engine. For example, the vehicle operator may apply the brakes to counteract acceleration due to gravity as the vehicle travels down the hill to maintain the vehicle speed (plot 602).

At time t3, the road gradient (plot 604) surpasses the second lower threshold gradient (dashed line 610b) as the road gradient becomes less negative and approaches level. As such, the first threshold brake value (plot 614) and the second threshold brake value (plot 616) return to their minimum values. Furthermore, beginning at time t3, the vehicle operator depresses the brake pedal to increase the brake value (plot 606) and decelerate the vehicle (plot 602). Between time t3 and time t4, the brake value (plot 606) surpasses the first threshold brake value (plot 614). As a result, a controller of the start-stop system (e.g., controller 12 or controller 102 of FIG. 1) may shut down the engine in response to conditions for shutting down the engine being met. In the example of FIG. 6, conditions for shutting down the engine are met when the brake value is greater than or equal to the first threshold brake value and the vehicle speed is equal to zero. Therefore, at time t4, in response to the vehicle speed reaching zero (plot 602), the engine is shut down (plot 608).

Between time t4 and time t5, the brake value (plot 606) decreases below the first threshold brake value (plot 614), such as due to the vehicle operator relaxing and shifting his or her foot. However, the brake value (plot 606) remains above the second threshold brake value (plot 616), and so the engine remains off (plot 608). At time t5, the vehicle operator releases the brake pedal, and the brake value is reduced to zero (plot 606). In response to the brake value dropping below the second threshold brake value (plot 616), the engine is restarted (plot 608).

Between time t5 and time t6, the vehicle speed (plot 602) as the vehicle is accelerated from a speed of zero. The road gradient (plot 604) decreases below the second lower threshold gradient (dashed line 610b) as the vehicle again descends down a hill, and the first (plot 614) and second (plot 616) threshold brake values are adjusted accordingly. The brake value (plot 606) remains below the first threshold brake value (plot 614), and the engine remains on (plot 608).

At time t6, the road gradient (plot 604) drops below the second upper threshold gradient (dashed line 612b). With the road gradient in a region corresponding to region R3' of FIGS. 3-5, for example, the first (plot 614) and second (plot 616) threshold brake values reach maximum values. The vehicle operator increases the brake value (plot 606) to decrease the vehicles speed (plot 602), but the vehicle remains in motion, and the brake value remains below the first threshold brake value (plot 614). Thus, the engine remains on (plot 608).

At time t7, the road gradient (plot 604) increases above the second upper threshold gradient (dashed line 612b). As a result, the first (plot 614) and second (plot 616) threshold brake values both decrease and vary with the gradient. Between time t7 and time t8, the road gradient (plot 604) continues to increase, passing through the region around level defined by the second lower threshold gradient (dashed line 610b) and the first lower threshold gradient (dashed line 610a). The brake value (plot 606) remains below the first threshold brake value (plot 614) throughout, and the engine remains on (plot 608).

The vehicle continues to travel uphill, and at time t8, the road gradient (plot 606) increases above the first lower threshold gradient (dashed line 610a). The first (plot 614) and second (plot 616) threshold brake values vary with the gradient, but increase at a slower rate than when the road gradient was between the second lower threshold gradient (dashed line 610b) and the second upper threshold gradient (dashed line 612b) between time t2 and time t3 due to the uphill direction of the vehicle. The vehicle operator does not apply the brakes between time t8 and time t9, and thus, the brake value (plot 606) is equal to zero, and the engine remains on (plot 608) to propel the vehicle.

At time t9, the vehicle operator applies the brakes, as shown by the increase in the brake value (plot 606), and the vehicle speed decreases (plot 602). Between time t9 and time t10, the brake value (plot 606) reaches the first threshold brake value (plot 614), enabling the controller of the start-stop system to shut down the engine in response to conditions for shutting down the engine being met. At time t10, the vehicle speed (plot 602) reaches zero. As a result, the engine is shut down at time t10 (plot 608). The brake value (plot 606) fluctuates, but does not drop below the second threshold brake value (plot 616). Thus, the engine remains off (plot 608) as the vehicle remains stopped on the uphill gradient (plot 604).

In this way, by determining the first and second threshold brake values with respective functions of gradient such that a difference between the first and second threshold brake values varies as a function of the gradient, inadvertent engine shutdowns and restarts may be reduced. As a result, fuel usage, vehicle emissions, and wear to the cranking system are reduced, and vehicle operator satisfaction may be increased. Furthermore, a vehicle operator may have increased, more intuitive control over the start-stop system via the brake pedal, further increasing vehicle operator satisfaction.

The technical effect of varying a difference between an engine shut down threshold and an engine restart threshold of a start-stop system is that inadvertent shut downs and restarts may be avoided.

In one example, a method comprises: stopping a vehicle engine when a brake value related to vehicle braking force exceeds a first threshold brake value related to a first function of road gradient; and restarting the engine when the brake value falls below a second threshold value related to a second function of road gradient, the difference between the first and second threshold brake values varying based on a magnitude of the road gradient. In the preceding example, additionally or optionally, the difference between the first and second threshold brake values varies based on both the magnitude of the road gradient and a direction of the road gradient relative to a front of the vehicle. In any or all of the preceding examples, additionally or optionally, determining the first threshold brake value and determining the second threshold brake value comprises calculating the first and second threshold brake values using the first and second functions of road gradient, respectively. In any or all of the preceding examples, additionally or optionally, determining the first threshold brake value and determining the second threshold brake value comprises looking up the first and second threshold brake values in one or more tables according to the road gradient, wherein each of the one or more tables is populated according to the first and second functions of road gradient. In any or all of the preceding examples, additionally or optionally, the first function of road gradient and/or the second function of road gradient defines a proportional relationship between the road gradient and the corresponding threshold brake value. In any or all of the preceding examples, additionally or optionally, the first function of road gradient and/or the second function of road gradient defines a relationship between the road gradient and the corresponding threshold brake value in which the corresponding threshold brake value tends to a maximum value as the road gradient increases. In any or all of the preceding examples, additionally or optionally, the first function of road gradient and/or the second function of road gradient differs depending on the direction in which the vehicle is facing on the road. In any or all of the preceding examples, additionally or optionally, the first and second functions of road gradient are defined such that the difference between the first and second threshold brake values increases as the road gradient increases until a maximum value is reached. In any or all of the preceding examples, additionally or optionally, the first and second functions of road gradient are defined such that the difference between the first and second threshold brake values tends to a maximum value as the road gradient increases. In any or all of the preceding examples, additionally or optionally, the first function of road gradient is equal to the brake pressure required to hold the vehicle stationary on a surface inclined to a corresponding road gradient.

As another example, a method comprises: determining a current brake value of a brake system in a vehicle and a current gradient of a surface on which the vehicle is positioned, the current gradient including a magnitude and a direction relative to a front of the vehicle; determining a first threshold brake value based on the current gradient; shutting down an engine of the vehicle without a shutdown command from a vehicle operator in response to the current brake value reaching or exceeding the first threshold brake value; determining a second threshold brake value based on the current gradient, the second threshold brake value lower than the first threshold brake value by an amount that varies based on the current gradient; and restarting the engine without an engine start command from the vehicle operator in response to the current brake value reaching or decreasing below the second threshold brake value. In the preceding example, additionally or optionally, determining the first threshold brake value based on the current gradient includes inputting the current gradient into a first function of gradient, and determining the second threshold brake value based on the current gradient includes inputting the current gradient into a second function of gradient. In any or all of the preceding examples, additionally or optionally, the current brake value is proportional to a displacement of a brake pedal by the vehicle operator. In any or all of the preceding examples, additionally or optionally, determining the current brake value of the brake system includes measuring the displacement of the brake pedal via a brake pedal position sensor. In any or all of the preceding examples, additionally or optionally, determining the current brake value of the brake system includes measuring a pressure of brake fluid in the brake system via a brake sensor, and determining the current gradient of the surface on which the vehicle is positioned includes estimating the current gradient with one or more sensors. In any or all of the preceding examples, additionally or optionally, each of the first threshold brake value and the second threshold brake value generally increases as the current gradient increases until a corresponding maximum threshold brake value is reached.

As another example, a vehicle system comprises: an engine configured to propel the vehicle via combustion of an air-fuel mixture; an electric motor configured to perform a starting operation of the engine; a brake system configured to slow a rotation of wheels of the vehicle based on input from a vehicle operator via a brake pedal; a brake sensor for measuring a brake value of the brake system; and a start-stop system configured to shut down the engine automatically when the brake value exceeds a first threshold brake value and restart the engine automatically when the brake value drops below a second threshold brake value, the start-stop system including a controller holding executable instructions in non-transitory memory that, when executed, cause the controller to: determine the first threshold brake value according to a gradient of a surface on which the vehicle is positioned, the gradient including a magnitude and a direction relative to a front of the vehicle; determine the second threshold brake value according to the gradient, wherein the first and second threshold brake values are determined such that a difference between the first and second threshold brake values varies as a function of the gradient. In the preceding example, the start-stop system additionally or optionally further comprises a sensor for determining the gradient. In any or all of the preceding examples, additionally or optionally, the brake value is one of a brake pressure, a brake torque, and a displacement of the brake pedal. In any or all of the preceding examples, additionally or optionally, the difference between the first and second threshold brake values is larger when the direction of the gradient is negative relative to a positive gradient of a same magnitude.

In another representation, a method of operating a motor vehicle is provided, wherein the motor vehicle comprises a start-stop system configured to shut down an engine of the vehicle automatically when a brake value of a brake system of the vehicle exceeds a first threshold brake value and restart the engine automatically when the brake value drops below a second threshold brake value, the method comprising: determining the first threshold brake value as a first function of a gradient of a surface on which the vehicle is positioned; and determining the second threshold brake value as a second function of the gradient, wherein the first and second threshold brake values are determined such that a difference between the first and second threshold brake values varies as a function of the gradient. In the preceding example, additionally or optionally, at least one of the first and second threshold brake values comprises a brake pressure, a braking torque, or a brake pedal displacement.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
an engine configured to propel the vehicle via combustion of an air-fuel mixture;
an electric motor configured to perform a starting operation of the engine;
a brake system configured to slow a rotation of wheels of the vehicle based on input from a vehicle operator via a brake pedal;
a brake sensor for measuring a brake value of the brake system; and
a start-stop system configured to shut down the engine automatically when the brake value exceeds a first threshold brake value and restart the engine automatically when the brake value drops below a second threshold brake value, the start-stop system including a controller holding executable instructions in non-transitory memory that, when executed, cause the controller to:
determine the first threshold brake value according to a gradient of a surface on which the vehicle is positioned, the gradient including a magnitude and a direction relative to a front of the vehicle;
determine the second threshold brake value according to the gradient, wherein the first and second threshold brake values are determined such that a difference between the first and second threshold brake values varies as a function of the gradient.

2. The system of claim 1, wherein the start-stop system further comprises a sensor for determining the gradient.

3. The system of claim 1, wherein the brake value is one of a brake pressure, a brake torque, and a displacement of the brake pedal.

4. The system of claim 1, wherein the difference between the first and second threshold brake values is larger when the direction of the gradient is negative relative to a positive gradient of a same magnitude.

5. A method, comprising:
stopping a vehicle engine when a brake value related to vehicle braking force exceeds a first threshold brake value related to a first function of road gradient; and
restarting the engine when the brake value falls below a second threshold value related to a second function of road gradient, the difference between the first and second threshold brake values varying based on a magnitude of the road gradient.

6. The method of claim 5, wherein the difference between the first and second threshold brake values varies based on both the magnitude of the road gradient and a direction of the road gradient relative to a front of the vehicle.

7. The method of claim 5, wherein determining the first threshold brake value and determining the second threshold brake value comprises calculating the first and second threshold brake values using the first and second functions of road gradient, respectively.

8. The method of claim 5, wherein determining the first threshold brake value and determining the second threshold brake value comprises looking up the first and second threshold brake values in one or more tables according to the road gradient, wherein each of the one or more tables is populated according to the first and second functions of road gradient.

9. The method of claim 5, wherein the first function of road gradient and/or the second function of road gradient defines a proportional relationship between the road gradient and the corresponding threshold brake value.

10. The method of claim 5, wherein the first function of road gradient and/or the second function of road gradient defines a relationship between the road gradient and the corresponding threshold brake value in which the corresponding threshold brake value tends to a maximum value as the road gradient increases.

11. The method of claim 5, wherein the first function of road gradient and/or the second function of road gradient differs depending on the direction in which the vehicle is facing on the road.

12. The method of claim 5, wherein the first and second functions of road gradient are defined such that the difference between the first and second threshold brake values increases as the road gradient increases until a maximum value is reached.

13. The method of claim 5, wherein the first and second functions of road gradient are defined such that the difference between the first and second threshold brake values tends to a maximum value as the road gradient increases.

14. The method of claim 5, wherein the first function of road gradient is equal to the brake pressure required to hold the vehicle stationary on a surface inclined to a corresponding road gradient.

15. A method, comprising:
 determining a current brake value of a brake system in a vehicle and a current gradient of a surface on which the vehicle is positioned, the current gradient including a magnitude and a direction relative to a front of the vehicle;
 determining a first threshold brake value based on the current gradient;
 shutting down an engine of the vehicle without a shutdown command from a vehicle operator in response to the current brake value reaching or exceeding the first threshold brake value;
 determining a second threshold brake value based on the current gradient, the second threshold brake value lower than the first threshold brake value by an amount that varies based on the current gradient; and
 restarting the engine without an engine start command from the vehicle operator in response to the current brake value reaching or decreasing below the second threshold brake value.

16. The method of claim 15, wherein determining the first threshold brake value based on the current gradient includes inputting the current gradient into a first function of gradient, and determining the second threshold brake value based on the current gradient includes inputting the current gradient into a second function of gradient.

17. The method of claim 15, wherein the current brake value is proportional to a displacement of a brake pedal by the vehicle operator.

18. The method of claim 17, wherein determining the current brake value of the brake system includes measuring the displacement of the brake pedal via a brake pedal position sensor.

19. The method of claim 15, wherein determining the current brake value of the brake system includes measuring a pressure of brake fluid in the brake system via a brake sensor, and determining the current gradient of the surface on which the vehicle is positioned includes estimating the current gradient with one or more sensors.

20. The method of claim 15, wherein each of the first threshold brake value and the second threshold brake value generally increases as the current gradient increases until a corresponding maximum threshold brake value is reached.

* * * * *